Figure 1:
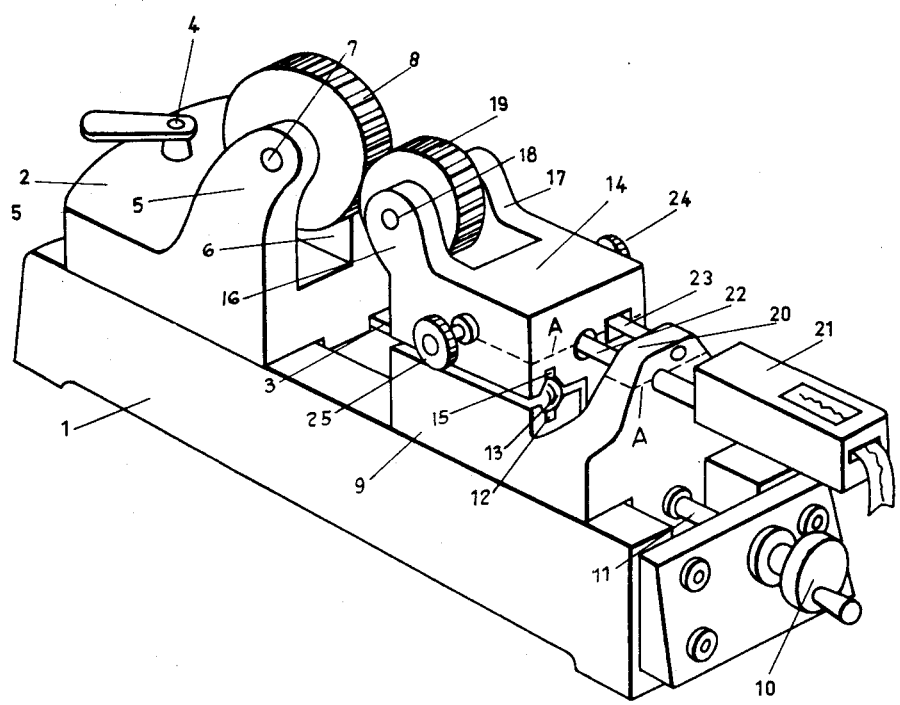

Oct. 18, 1960 A. W. DINGER 2,956,345
GEAR TESTING EQUIPMENT
Filed March 14, 1958 2 Sheets—Sheet 1

Oct. 18, 1960
A. W. DINGER
2,956,345
GEAR TESTING EQUIPMENT
Filed March 14, 1958
2 Sheets-Sheet 2
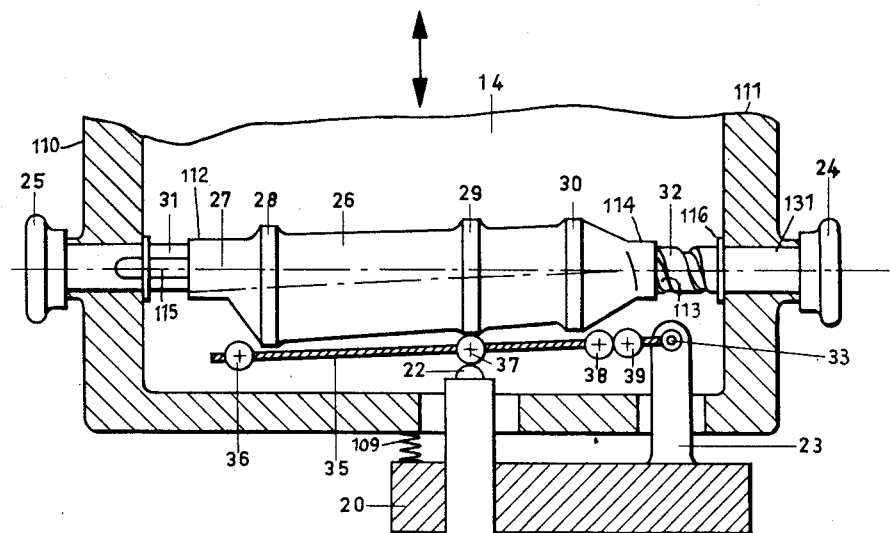
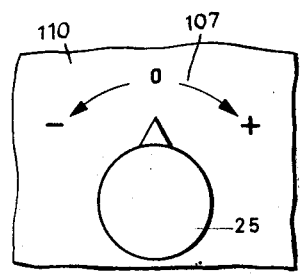
Fig. 3
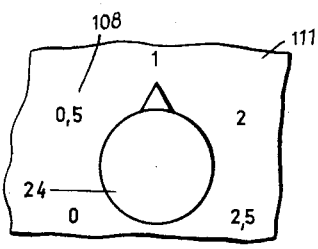
Fig. 4

United States Patent Office 2,956,345
Patented Oct. 18, 1960

2,956,345
GEAR TESTING EQUIPMENT

Alfons Willy Dinger, Minden, Westphalia, Germany, assignor to Schoppe & Faeser G.m.b.H., Minden, Westphalia, Germany, a company of Germany Filed Mar. 14, 1958, Ser. No. 721,457

Claims priority, application Germany Feb. 22, 1958

5 Claims. (Cl. 33—179.5)

This invention relates to a gear testing equipment where the gear to be tested and an extremely accurate tooth wheel, a so-called master wheel, are brought into mesh and rotate upon each other. One of the two wheels is pivotally mounted on an arrestable slidable carriage which during measurement is fixed in a definite position. The other wheel pivots on another carriage which is freely movable in one direction at right angle to the axis of the wheel. This carriage is pressed in the direction of the arrested carriage for instance by spring tension, so that the two wheels always stay in engagement with each other. In case of inaccuracy of the tooth wheel to be tested, the two wheels are pressed apart and the freely movable carriage leaves the arrested carriage. This movement of the freely movable carriage serves as a measure for the faults of the tooth wheel to be tested which may be recorded by means of a mechanical or electrical recorder. This invention is a considerable improvement of such gear testing devices. The method covered by the invention allows the testing of tooth wheels with considerable faults, i.e. high tolerances, as well as tooth wheels with smallest faults, while using the same equipment. The main purpose of the invention is to provide for a variable transmission between the movement of the carriage and the scanner of the indicator or recorder. By means of simple manipulations it is furthermore possible to change the transmission in the transmission rods between the carriage and the recorder or indicator. This method furthermore enables to adjust the zero point of the indicator or the zero of the recorder by means of a simple and sturdy device. Further details are given in the enclosed drawing. Fig. 1 shows an example for an equipment according to the invention and Fig. 2 represents part of the device for transmitting the movement of the carriage to the recorder. Figs. 3 and 4 show the construction of two adjusting devices. Referring first to Fig. 1 we note that 1 stands for the supporting bed for the test equipment. In this bed 1 the carriage 2 is arranged such that it may be shifted in groove 3 in a longitudinal direction. By means of a fixing device which is actuated by means of a catch 4, the carriage 2 may be connected tightly to bed 1 in any position. Carriage 2 carries two jibs 5 and 6 supporting the axle 7 of tooth wheel 8. Tooth wheel 8 may be the tooth wheel to be tested or the master wheel. Another carriage 9 is arranged shiftably in groove 3 in the bed 1. By means of hand wheel 10 and spindle 11 said carriage 9 can be shifted and maintained stationary in any position to bed 1. The top of carriage 9 has grooves or rails 12 in longitudinal direction with a number of balls arranged in them. On top of carriage 9 another carriage 14 is placed. Carriage 14 has also grooves 15 at the bottom. Grooves 12 and 15 constitute together with balls 13 a frictionless bedding for carriage 14 on top of carriage 9, thus ensuring that carriage 14 moves in longitudinal direction without any friction. This kind of arrangement of the movable carriage may be replaced by other types of frictionless arrangements, e.g. leaf springs. Carriage 14 is also fitted with two jibs 16 and 17 carrying the axle 18 of tooth wheel 19. The carriage 14 is urged toward the normally fixed carriage 2 by means of a spring 109 bearing against an abutment part or jib 20 fixed to the carriage 9. By means of this spring the carriage 14 is pressed slightly to the left, thus ensuring that the two gear wheels 8 and 9 stay in engagement. Jib 20 also serves for fastening recorder 21. For this measurement a recording mechanical sensitive gauge with large transmission is used with preference. Gauge 21 is connected to carriage 14 by means of sensing lever 22. Furthermore jib 20 serves as fixed support for rod 23 which at the left end serves as fixed supporting point for a lever arranged inside carriage 14. The carriage is fitted with two lateral adjusting wheels 24 and 25. Fig. 2 shows details of a mechanism, inside the carriage 14, for varying the ratio of movement by the carriage 14 to the movement of the sensing lever 22 on the gauge 21. Fig. 2 shows a sectional drawing of carriage 14 of Fig. 1 and of jib 20. Fig. 2 is a sectional drawing of carriage 14 along line A—A of Fig. 1.

When rotating the two wheels against each other the faults of the tooth wheel become noticeable as a change of the distance between the axis, thus carriage 14 with frictionless support carrying out movements in the direction of the double arrows of Fig. 2. The movements of carriage 14 are to be transmitted to a measuring instrument, with preference to a recording sensitive gauge 21. The case of this gauge is rigidly secured by jib 20, the latter being fixed to carriage 9 of Fig. 1 in stationary position during the measuring procedure. The transmission of the carriage movement to the recording gauge 21 is obtained by push rod 22. An elongated cam member 26 is arranged in the carriage 14 having the axis of rotation 27 of the member at right angles to the direction of movement of the carriage. The member 26 may be considered to be composed of disk members 28, 29 and 30 spaced longitudinally along the axis 27 each having a different amount of eccentricity.

The cam member is mounted for longitudinal movement along its axis of rotation on two separate coaxial shafts 31 and 32 bearingly passing through as at 121 opposite walls 110 and 111 of the carriage 14. The shafts 31 and 32 respectively carry the hand wheels 25 and 24, mentioned before, outer of the walls, and are received in end portions 112 and 114 of the member 26. The end portion 112 is splined on the shaft 31 as at 115 to permit relative longitudinal motion of the two but without relative turning. The shaft 32 is helically treaded or grooved as at 113 into the end portion 114 so that relative turning of the member 26 and shaft 32 impart the longitudinal movement mentioned above. Axial movement of the shaft 32 is prevented by a collar 116. The highest points on the disks or eccentrics 28, 29 and 30 all preferably lie in the same plane and better still in a straight line as shown.

A transmitting lever 35, provided with fixed engagement balls 36, 37, 38 and 39 along the length thereof, is pivoted as at 33 via the post or rod 23 on the jib 20 and swings in a plane parallel with the direction of movement of the carriage 14. The spacing of the disks relative to their engagement balls is such that there can be engagement between only one ball and a disk for any longitudinal position of the member 26. As explained more in detail below, the spacings of the disks and engagement balls is such that by longitudinal shifting of the member 26 a predetermined leverage factor may be obtained by which the movement of the sensing rod 22 is a multiple or submultiple of the movement of the carriage 14.

As shown, the tip of the sensing rod 22 for gauge 21 rest against ball 37. The remaining balls 36, 38 and 39 are arranged in such a manner that they share the effective length of lever 35 with respect to point 37 and in a certain proportion. The position of member 26 of the drawing reveals that eccentric 29 is arranged at ball 37, eccentric 29 fitting tightly to the ball due to the rotation of the shaft 31 by means of hand wheel 25. Consequently the movement of carriage 14 is transmitted direct at the relation 1:1, that means without lever transmission, to pin 22 of gauge 21 and recorded. When turning hand wheel 24 or the shaft 32, the eccentric 26 may be displaced either to the left or right, thus either eccentric 28 engaging with ball 36 at lever 35 or eccentric 30 with one of balls 38 or 39. If eccentric 26 is shifted to the left until eccentric 28 engages with ball 36, the movement of carriage 14 is no longer transmitted direct to the sensing lever 22 of gauge 21 but across lever 35 according to the distance of balls 36 and 37 from hinge 33 of lever 35. When choosing the measures accordingly, this position of member 26 results for instance in a decrease of the carriage movement to half its value. However an increase of the carriage movement is obtained with member 26 in a position where eccentric 30 engages with one of balls 38 or 39, i.e. this increase when resting against ball 38 corresponding to the position of the balls to factor 2 or 2.5, whereas this factor is 2½ or 5 if resting against ball 39. In this case there is also the possibility of turning the eccentric by means of hand wheel 25 and thus to adapt eccentric 30 accurately to balls 38 or 39. The possibility of rotating eccentrics 28, 29 and 30 has furthermore the purpose to adjust at will the zero position of the pointer or recording pin of the recording sensitive gauge 21. The eccentricity of eccentric discs 28, 29 and 30 should be chosen such that the eccentricity of disc 28 is larger than that of disc 29, the latter being again larger than that of disc 30. An equal rotation of eccentric 26 then results in a definite equal shifting of the zero point of gauge 21, irrespective of which eccentric disc for transmisison of the carriage movement rests on the lever.

Figs. 3 and 4 show the two hand wheels 25 and 24. At hand wheel 24 those positions are marked with indicia 108 which correspond to definite longitudinal positions of eccentric 26 and thus to definite ratios. Indicia 107 are provided for the hand wheel or dial 25 to indicate generally the eccentricity being used for a given disc. The zero position being, say, for midway between highest and lowest parts of the cam disks.

The adjustment of the transmission ratio achieved by the described equipment in conjunction with the possibility of shifting the zero position proves to be of great advantage particularly in conjunction with a recording device for the carriage movement such as a recording sensitive gauge. If the gauge 21 itself be provided with a multi-value motion multiplier quite a variety of factors of movement may be obtained particularly when the various multiplying factors of the gauge are different from those afforded by the lever 35. Generally, the lever multiplying factors (0.5; 1; 2; 2.5 shown as examples) are comparatively small factors while a gauge normally is provided with only adjustments for a much greater difference in factors. Often it proves advantageous to provide in addition to the recording gauge an indicating sensitive gauge with the carriage acting direct on the indicator and its movement being recorded by means of the recording gauge by inserting the device with variable ratio.

I claim:

1. In a motion multiplier, the combination of a lever mounted for pivotal movement in a substantially fixed plane and having a motion transmitting portion and a plurality of outstanding discretely spaced cam engageable portions; and a rotary longitudinal cam member having a plurality of cam portions spaced along the axis of the cam member, one of said cam portions being radially engageable with one of the cam engaging portions for moving the lever to a predetermined position relative to said axis, said cam member being translatable with the axis thereof being and remaining in said plane, means for shifting the cam member along the axis thereof relative to the cam engageable portions, the spacing of the portions on the lever being different from the spacing of the portions on the cam member so that different combinations of cam and engagement portions may be engaged to produce different multiplication factors, and sensing means for sensing pivotal movement of the lever when the cam member is translated in said plane in engagement with the lever.

2. In a motion multiplier as claimed in claim 1, the highest points of the respective cam portions lying substantially in a common plane.

3. A gear testing device comprising first and second relatively reciprocatory mounted members, means for mounting gears for rotation against each other and with respect to said members so that relatively reciprocatory movement of the members during said rotation is an indication of quality of at least one of the gears; a sensing device substantially fixed with respect to the first member, and having a sensing part; a lever pivoted on the first member for engaging the sensing part and having discrete cam engaging portions outstanding from the lever and spaced along the lever, and a longitudinal cam member mounted for rotation on the second member and translatable therewith during said movement, and provided with longitudinally spaced cam portions each for selectively engaging one of said discrete portions, the cam member being shiftable along its axis of rotation.

4. A gear testing device comprising first and second relatively reciprocatory mounted members, means for mounting gears for rotation against each other and with respect to said members so that relatively reciprocatory movement of the members during said rotation is an indication of quality of at least one of the gears; a sensing device substantially fixed with respect to the first member, and having a movable sensing part; a lever pivoted on the first member for engaging the sensing part, and pivoted for movement in a plane; an elongated cam member mounted on the second member for rotation about an axis lying substantially in said plane, the cam member and lever being provided with spaced mutually engageable portions and being shiftable longitudinally with respect to each other so that different portions on the cam member may engage respectively different portions on the lever to vary the effective length of the lever arm, the radial height of the cam portions varying with their position along the axis of rotation in such a manner so as to give the substantially same amount of pivotal movement to the lever with the same amount of turning of the cam member irrespective of the portions engaged.

5. A testing device as claimed in claim 4, the second member having two spaced walls and the cam member lying therebetween, the cam member having end portions substantially axially alined, a pair of rotary shafts bearingly passing through the respective walls and projecting into the end portions, thread means on one shaft and end portion for shifting the cam member along the axis thereof and spline means on the other shaft and end portion for permitting the cam member to move longitudinally on such shaft and for transmitting rotary movement of same to the cam member.

References Cited in the file of this patent

UNITED STATES PATENTS

| | | |
|---|---|---|
| 703,725 | Hardinge | July 1, 1902 |
| 1,049,860 | Hirth | Jan. 7, 1913 |
| 1,257,483 | Hart | Feb. 26, 1918 |
| 1,390,432 | Douglass | Sept. 13, 1921 |
| 1,444,470 | Laeesker | Feb. 6, 1923 |
| 2,394,284 | Berges | Feb. 5, 1946 |
| 2,447,282 | Scinta | Aug. 17, 1948 |
| 2,661,542 | Bean | Dec. 8, 1953 |
| 2,693,708 | Baer | Nov. 9, 1954 |
| 2,726,455 | Saari | Dec. 13, 1955 |
| 2,783,652 | Smith | Mar. 5, 1957 |
| 2,815,581 | Strelow | Dec. 10, 1957 |